United States Patent [19]

Nishikawa et al.

[11] Patent Number: 4,660,442
[45] Date of Patent: Apr. 28, 1987

[54] CREEP-INHIBITING DEVICE FOR AN AUTOMOTIVE VEHICLE EQUIPPED WITH AN AUTOMATIC TRANSMISSION

[75] Inventors: Masao Nishikawa, Tokyo; Takashi Aoki, Fujimi; Yoichi Sato, Wako, all of Japan

[73] Assignee: Honda Giken Kogyo K.K., Tokyo, Japan

[21] Appl. No.: 733,517

[22] Filed: May 13, 1985

[30] Foreign Application Priority Data

May 14, 1984 [JP] Japan .................................. 59-97265
May 14, 1984 [JP] Japan .................................. 59-97266

[51] Int. Cl.⁴ ............................................. B60K 41/22
[52] U.S. Cl. ......................................... 74/869; 74/865
[58] Field of Search ................. 74/861, 869, 867, 868, 74/878, 865, 866, 877

[56] References Cited

U.S. PATENT DOCUMENTS

| | | | |
|---|---|---|---|
| 4,313,353 | 2/1982 | Honig ..................... | 74/868 |
| 4,478,108 | 10/1984 | Nishimura et al. .............. | 74/867 X |
| 4,501,173 | 2/1985 | Honig ................... | 74/867 X |
| 4,513,638 | 4/1985 | Nishikawa et al. ................ | 74/866 |
| 4,513,639 | 4/1985 | Hiramatsu ................ | 74/866 |
| 4,526,065 | 7/1985 | Rosen et al. ................. | 74/868 X |

FOREIGN PATENT DOCUMENTS

| | | | |
|---|---|---|---|
| 3019274 | 11/1981 | Fed. Rep. of Germany ........ | 74/866 |
| 3022364 | 12/1981 | Fed. Rep. of Germany ........ | 74/877 |
| 0063046 | 5/1980 | Japan ................................ | 74/866 |
| 0149453 | 11/1980 | Japan ................................ | 74/869 |

Primary Examiner—Leslie Braun
Assistant Examiner—David Novais
Attorney, Agent, or Firm—Arthur L. Lessler

[57] ABSTRACT

A creep-inhibiting device for use in an automotive vehicle equipped with a transmission mechanism coupled in series to a fluid coupling and having a frictionally engaging element. Control means interposed between the frictionally engaging element and an operating fluid source controls the power transmission capacity of the frictionally engaging element within a range from substantially zero to a predetermined value in dependence on a signal fluid pressure representative of engine load, to inhibit creeping of the vehicle when the vehicle engine is in a no-load state. The control means has a valve body selectively connecting and disconnecting an input fluid line to and from an output fluid line. A first pressure chamber defined by a first end face of the valve body is supplied with an operating fluid pressure in the output fluid line, while a second pressure chamber defined by a second end face of the valve body is supplied with the signal fluid pressure. A third fluid line having a restriction always connects the input and output fluid lines with each other, and a resilient member urges the valve body in a direction of connecting the input fluid line to the output fluid line. The operating fluid pressure in the output fluid line is allowed to escape through a drain line to a lower pressure zone by an amount corresponding to an amount by which the valve body is biased in a direction of disconnecting the input fluid line from the output fluid line.

4 Claims, 4 Drawing Figures

CREEP-INHIBITING DEVICE FOR AN AUTOMOTIVE VEHICLE EQUIPPED WITH AN AUTOMATIC TRANSMISSION

BACKGROUND OF THE INVENTION

This invention relates to a creep-inhibiting device for use in an automotive vehicle equipped with an automatic transmission, and more particularly to a creep-inhibiting device of this kind which has improved responsiveness to stepping-on of the accelerator pedal so as to quickly recover a creep-permitting state.

In an automotive vehicle equipped with an automatic transmission having a fluid coupling such as a torque converter, the phenomenon can occur that, due to dragging torque of the torque converter, the vehicle moves forward or creeps against the driver's will when the vehicle stands with the shift lever shifted to a drive range (forward) position, creating a load on the engine. Such load on the engine, if applied at engine idle, causes a drop in the rotational speed of the engine, even resulting in engine stall. To avoid this disadvantage, the driver has to step on the accelerator pedal by an amount corresponding to the dragging torque so as to prevent a drop in the rotational speed of the engine at idle. However, this is not desirable from the viewpoint of fuel curtailment. Therefore, it is desired that when the engine is at idle, the transmission is automatically brought into a neutral state to interrupt power transmission between the engine and the driving wheels, so that the driver is not required to step on the accelerator pedal by a large amount, for economy of fuel consumption. It is known that a creep-inhibiting device manufactured for this purpose can also provide an advantage that vibrations of the vehicle body are reduced during idling operation of the engine, which is particularly effective when the device is applied to front wheel-driven vehicles.

Although creeping of the vehicle can be avoided by reducing the torque transmission capacity of a frictionally engaging element used for starting of the vehicle, i.e. a first-speed clutch, to substantially zero upon stoppage of the vehicle, the torque transmission capacity has to soon be recovered in response to the engine load, i.e. the stepping amount of the accelerator pedal, in order to start the vehicle. Particularly when the driver is required to move his vehicle in a narrow space, for instance, to park his vehicle in a space between vehicles parked in line with the street, it is desired to maintain the clutch in a slip-permitting state so that a desired small level of power transmission capacity may be obtained through the clutch, which is proportionate to a fine stepping amount of the accelerator pedal. On the other hand, when the vehicle is started with no other vehicle running ahead, it is required to shorten the slip-permitting period to a minimum possible value, so as to promptly establish complete engagement of the clutch. Otherwise the clutch becomes engaged only after the engine speed has risen to a high level, resulting in an uncomfortable shock and early wear of the clutch.

As is known, to increase the internal pressure of the first-speed clutch in good response to the stepping-on of the accelerator pedal, desirably the pressure within the clutch should not be reduced to zero even while the creep-inhibiting device is operating, but should be controlled in advance to a value as close as possible to and at the same time smaller than a pressure value above which the clutch becomes engaged against the force of a return spring provided in the clutch, hereinafter called "the engaging pressure Pe".

However, in practice, considerable variations exist in the engaging pressure Pe required between finished products due to tolerances in manufacturing the return spring and tolerances in machining parts that accommodate the return spring, making it difficult to control with accuracy the internal pressure of the first-speed clutch to a required preset value during operation of the creep-inhibiting device. If the return spring and its related parts are to be manufactured and machined with precision so as to overcome this disadvantage, the manufacturing cost will be increased.

SUMMARY OF THE INVENTION

It is the object of the invention to provide a creep-inhibiting device for use in an automotive vehicle, which is capable of controlling with accuracy the operating fluid pressure within the first-speed clutch to a required preset value, during operation of the creep-inhibiting device.

The invention provides a creep-inhibiting device for use in an automotive vehicle equipped with an engine, a fluid coupling, a transmission mechanism coupled in series to the fluid coupling and having a frictionally engaging element, and an operating fluid source for supplying an operating fluid to the frictionally engaging element. The creep-inhibiting device includes engine load sensor means for producing a signal fluid having a pressure representative of load applied on the engine, and control means interposed between the frictionally engaging element and the operating fluid source, wherein the control means is adapted to control the power transmission capacity of the frictionally engaging element within a range from substantially zero to a predetermined value in dependence on the pressure of the signal fluid supplied thereto, to thereby inhibit creeping of the vehicle when the engine is in a no-load state. The control means comprises an input fluid line connected to the operating fluid source, an output fluid line connected to the frictionally engaging element, a valve body disposed to selectively connect and disconnect the input fluid line to and from the output fluid line and having first and second end faces, a first pressure chamber defined in part by the first end face of the valve body and disposed to be supplied with an operating fluid pressure in the output fluid line, a second pressure chamber defined in part by the second end face of the valve body and disposed to be supplied with the pressure of the signal fluid, a third fluid line having a restriction and disposed to always connect the input fluid line to the output fluid line, resilient means urging the valve body in a direction of connecting the input fluid line to the output fluid line, and a drain line disposed to escape the operating fluid pressure in the output fluid line to a zone under a lower pressure when the valve body is biased in a direction of disconnecting the input fluid line from the output fluid line due to a difference in fluid pressure between the first pressure chamber and the second pressure chamber, by an amount corresponding to the amount by which the valve body is biased in the last-mentioned direction.

Preferably, the creep-inhibiting device includes shut-off valve means adapted to block the drain line when a braking device of the vehicle is detected to be operative by brake sensor means.

Also preferably, the control means includes adjusting means for adjusting the magnitude of the operating fluid pressure in the output fluid line, preferably the resilient force of the resilient means, so that the power transmission capacity of the frictionally engaging element is substantially zero.

The above and other objects, features and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
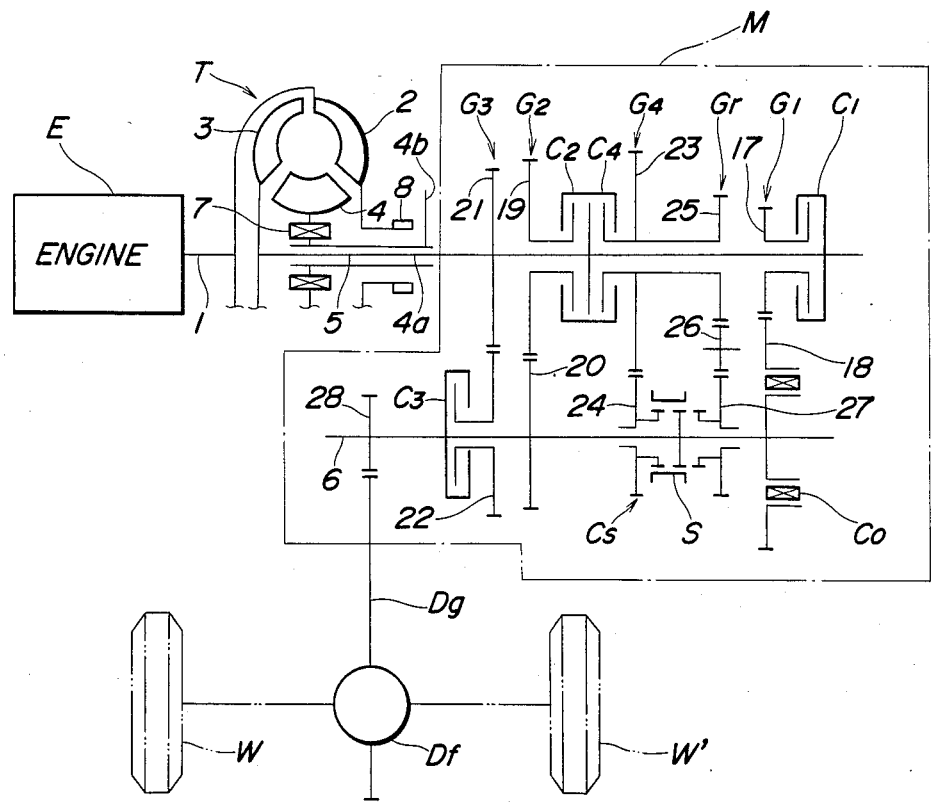
FIG. 1 is a schematic view of an automatic transmission for automotive vehicles, to which is applied a creep-inhibiting device according to the invention.

Referring first to FIG. 1, there is schematically illustrated an automatic transmission for automotive vehicles having four forward speed reduction gears and one reverse gear, to which the invention is applied. Output from an engine E is transmitted to driving wheels W and W' for driving same through a crankshaft 1 of the engine, a torque converter T as a fluid coupling, an auxiliary transmission M, and a differential Df in the mentioned order.

The torque converter T comprises a pump 2 coupled to the crankshaft 1, a turbine 3 coupled to an input shaft 5 of the auxiliary transmission M, and a stator 4 coupled, via a one-way clutch 7, to a stator shaft 4a which in turn is supported on the input shaft 5 for rotation relative thereto. Torque is transmitted from the crankshaft 1 to the pump 2, and then to the turbine 3 in a hydrodynamic manner. When amplification of torque takes place while torque is transmitted from the pump 2 to the turbine 3, the resulting reaction force is borne by the stator 4, as is already known.

Figure 2:
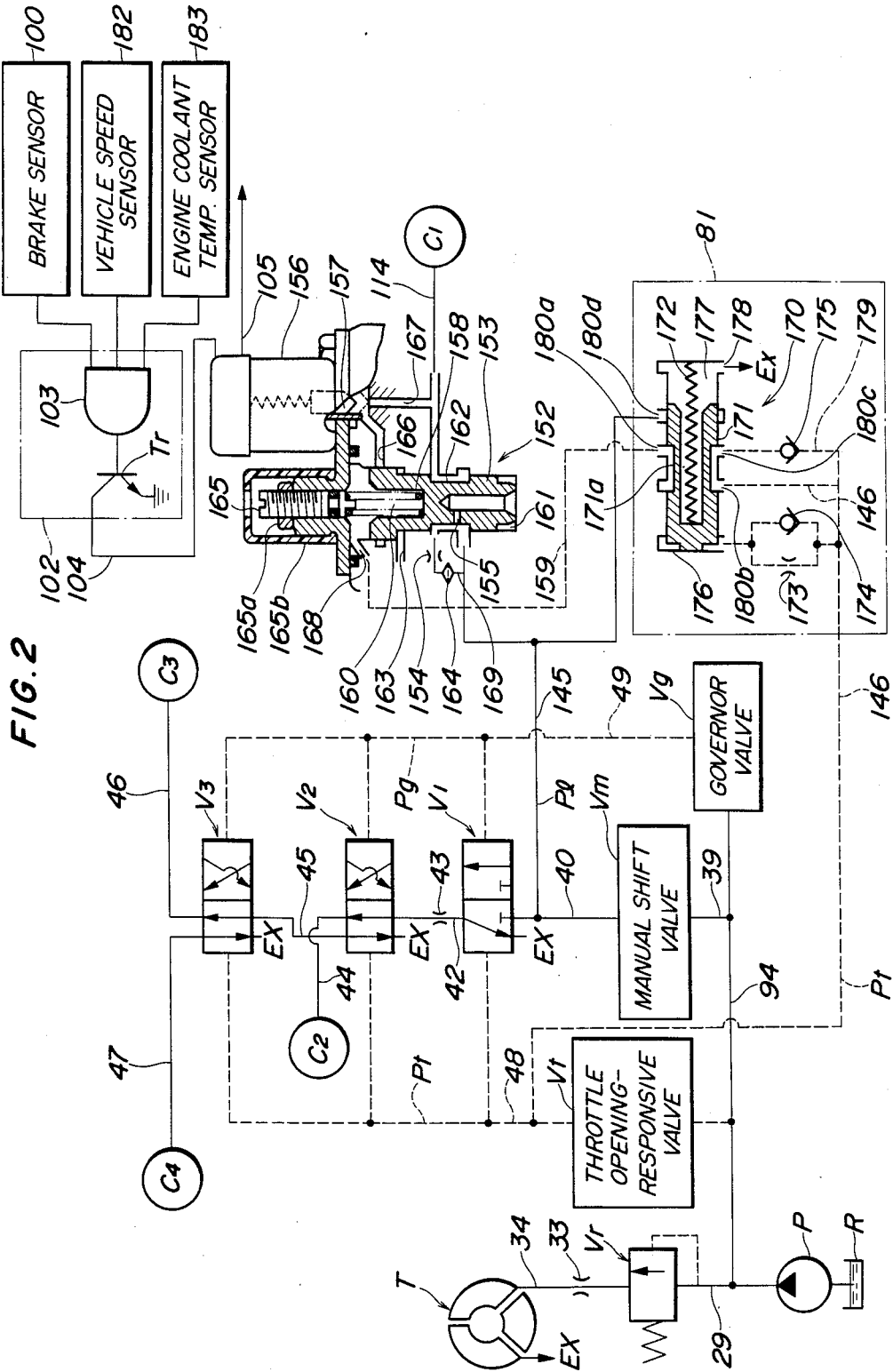
FIG. 2 is a circuit diagram illustrating a hydraulic control system employed in the automatic transmission of FIG. 1, in which is incorporated the creep-inhibiting device of the invention.

A pump driving gear 8 is arranged on a right end of the pump 2 as viewed in FIG. 1, for driving an oil hydraulic pump P appearing in FIG. 2. A stator arm 4b is secured to a right end of the stator shaft 4a for controlling a regulator valve Vr appearing in FIG. 2.

The auxiliary transmission M has an output shaft 6 extending parallel with the input shaft 5, and is provided with a first-speed gear train G1, a second-speed gear train G2, a third-speed gear train G3, a fourth-speed gear train G4, and a reverse gear train Gr, all arranged in juxtaposition between the input and output shafts 5, 6. The first-speed gear train G1 comprises a driving gear 17 connectible to the input shaft 5 through a first-speed clutch C1, and a driven gear 18 connectible to the output shaft 6 through a one-way clutch C0 and engaging with the driving gear 17. The second-speed gear train G2 comprises a driving gear 19 connectible to the input shaft 5 through a second-speed clutch C2, and a driven gear 20 secured to the output shaft 6 and engaging with the driving gear 19, while the third-speed gear train G3 comprises a driving gear 21 secured to the input shaft 5, and a driven gear 22 connectible to the output shaft 6 through a third-speed clutch C3 and engaging with the driving gear 21. The fourth-speed gear train G4 comprises a driving gear 23 connectible to the input shaft 5 through a fourth-speed clutch C4, and a driven gear 24 connectible to the output shaft 6 through a selector clutch Cs and engaging with the driving gear 23. On the other hand, the reverse gear train Gr comprises a driving gear 25 formed integrally with the driving gear 23 of the fourth-speed gear train G4, a driven gear 27 connectible to the output shaft 6 through the selector clutch Cs, and an idle gear 26 engaging with the gears 25, 27. The selector clutch Cs is arranged between the driven gears 24 and 27, and has a selector sleeve S which is shiftable between a left or forward position and a right or reverse position as viewed in FIG. 1, to selectively connect the driven gear 24 or 27 to the output shaft 6. The one-way clutch C0 permits the driving torque from the engine E alone to be transmitted to the driving wheels W, W', while prohibiting transmission of torque from the driving wheels W, W' to the engine E.

If the first-speed clutch C1 alone is engaged while the selector sleeve S is held in the forward position as illustrated in FIG. 1, the driving gear 17 is connected to the input shaft 5 to establish the first-speed gear train G1, thereby allowing transmission of torque from the input shaft 5 to the output shaft 6 therethrough. Then, if the second-speed clutch C2 is engaged with the first-speed clutch C1 maintained in its engaged state, the driving gear 19 is connected to the input shaft 5 to establish the second-speed gear train G2 through which torque can be transmitted from the input shaft 5 to the output shaft 6. That is, even while the first-speed clutch C1 is engaged, the second-speed gear train G2, the third-speed gear train G3 or the fourth-speed gear train G4 can be established by the action of the one-way clutch C0, rendering the first-speed gear train G1 substantially inoperative. If the second-speed clutch C2 is disengaged and the third-speed clutch C3 is engaged instead, the driven gear 22 is connected to the output shaft 6 to establish the third-speed gear train G3, while if the third-speed clutch C3 is disengaged and the fourth-speed clutch C4 is engaged instead, the driving gear 23 is connected to the input shaft 5 to thereby establish the fourth-speed gear train G4. On the other hand, if the fourth-speed clutch C4 alone is engaged while the selector sleeve S of the selector clutch Cs is shifted to the right or reverse position, the driving gear 25 and the driven gear 27 are connected, respectively, to the input shaft 5 and the output shaft 6 to establish the reverse gear train Gr, thereby allowing transmission of torque from the input shaft 5 to the output shaft 6 through the reverse gear train Gr.

The torque transmitted to the output shaft 6 is then transmitted through an output gear 28 mounted on one end of the output shaft 6 to an enlarged gear Dg of the differential Df.

Referring now to FIG. 2 illustrating a creep-inhibiting device according to one embodiment of the invention, the oil hydraulic pump P sucks operating oil from an oil tank R for pressure delivery of same to fluid lines 29 and 94. The pressurized oil from the pump P has its pressure regulated to a predetermined value (hereinafter called "the line pressure Pl") by the regulator valve Vr, and is then delivered to a manual shift valve Vm, a throttle opening-responsive valve Vt, and a governor valve Vg.

Having been regulated to a predetermined pressure value by the regulator valve Vr, the pressurized oil is delivered in part to the interior of the torque converter T through an inlet fluid line 34 provided with a restriction 33, to increase the internal pressure of the torque converter T for prevention of cavitation therein. If the present invention is to be applied to a gasoline engine, the throttle opening-responsive valve Vt generates as a parameter representative of the load on the engine E a throttle pressure Pt corresponding to the stepping amount of an accelerator pedal, not shown, of the engine E, i.e. the valve opening of a throttle valve, not shown, arranged in the intake system of the engine E, and supplies same to a pilot fluid line 48. On the other hand, the governor valve Vg is rotatively driven by the output shaft 6 of the auxiliary transmission M or the enlarged gear Dg of the differential Df, to generate a governor pressure Pg variable in response to the vehicle speed and supply same to a pilot fluid line 49.

The manual shift valve Vm is arranged between a fluid line 39 branching off from the fluid line 94 and a fluid line 40, and shiftable between a neutral position, drive range positions such as D3 and D4 positions, and a reverse position. When the manual shift valve Vm assumes one of the drive range positions, the fluid lines 39, 40 become communicated with each other, while when the manual shift valve Vm is in the neutral position or the reverse position, the fluid line 40 is communicated with a drain line, not shown, to drain the pressurized oil in the fluid line 40 to the oil tank R. A fluid line 145 branches off from the fluid line 40 and has a creep-inhibiting valve 152 arranged therein, hereinafter referred to, and it is connected to a hydraulically operating portion of the first-speed clutch C1 as a frictionally engaging element for starting of the vehicle. The pressurized oil in the fluid line 40 is supplied not only to the first-speed clutch C1 via the creep-inhibiting valve 152, but also to hydraulically operating portions of the second-speed, third-speed and fourth-speed clutches C2, C3 and C4 in a selective manner depending upon the switching actions of a 1-2 shift valve V1, a 2-3 shift valve V2, and a 3-4 shift valve V3, as hereinafter described.

The shift valves V1–V3 each have a spool having one end face acted upon by the combined force of the throttle pressure Pt and a spring, not shown, and the other end by the governor pressure Pg, respectively, and are adapted to shift from a left or first position to a right or second position when the governor pressure Pg exceeds the combined force of the throttle pressure Pt and the spring with an increase in the governor pressure Pg, i.e. with an increase in the vehicle speed. The forces of the springs of the shift valves V1–V3 are set at respective different values. To be specific, the 1-2 shift valve V1, which is arranged between the fluid line 40 and a fluid line 42 provided with a restriction 43, is adapted to assume the first position as illustrated when the vehicle speed is low, to thereby disconnect the fluid line 42 from the fluid line 40. With the 1-2 shift valve V1 held in this position, the first-speed clutch C1 alone is engageable to establish the first-speed reduction ratio, so long as the creep-inhibiting valve 152 is open.

As the vehicle speed increases, the 1-2 shift valve V1 is shifted to the right or second position to communicate the fluid lines 40, 42 with each other. On this occasion, the 2-3 shift valve V2 is in the first position as illustrated, to communicate the fluid line 42 with a fluid line 44 connected to the hydraulically operating portion of the second-speed clutch C2. Although both the first-speed and second-speed clutches C1 and C2 are engaged on this occasion, the second-speed gear train G2 alone is established to provide the second-speed reduction ratio, while the first-speed gear train G1 is rendered substantially inoperative with the first-speed clutch C1 maintained in an engaged state, by the action of the one-way clutch C0 in FIG. 1. Likewise, when the third-speed or fourth-speed clutch C3, C4 is engaged, the third-speed or fourth-speed gear train G3, G4 alone is established while the first-speed gear train G1 is rendered substantially inoperative with the first-speed clutch C1 maintained in an engaged state.

When the vehicle speed further increases, the 2-3 shift valve V2 is shifted to the right or second position to communicate the fluid line 42 with a fluid line 45. On this occasion, the 3-4 shift valve V3 still assumes the left or first position as illustrated, to communicate the fluid line 45 with a fluid line 46 connected to the hydraulically operating portion of the third-speed clutch C3, whereby the third-speed clutch C3 becomes engaged to establish the third-speed reduction ratio.

The 3-4 shift valve V3 is shifted to the right or second position with a further increase in the vehicle speed, and the fluid line 45 is communicated with a fluid line 47 connected to the hydraulically operating portion of the fourth-speed clutch C4 so that the fourth-speed clutch C4 becomes engaged to establish the fourth-speed reduction ratio. The arrangement of the automatic transmission described above is known in the art.

The fluid line 145 branching off from the fluid line 40 connected to the manual shift valve Vm at its output side is connected via the creep-inhibiting valve 152 to a fluid line 114 connected to the hydraulically operating portion of the first-speed clutch C1. A valve body 153 of the creep-inhibiting valve 152 has an upper end face with a pressure-receiving surface area larger than that of a lower end face thereof. An axially central portion of the valve body 153 has its outer peripheral surface formed with an annular groove 162 in communication through a small hole 155 with a lower pressure chamber 161 defined in part by the lower end face of the valve body 153. The upper end face of the valve body 153 defines part of an upper pressure chamber 160 in which is arranged a spring 158 permanently urging the valve body 153 downward as viewed in FIG. 2. The spring 158 abuts at its upper end against an adjusting screw 165 so that by axially displacing the screw 165, the force of the spring 158 can be set at a desired value. Reference numeral 165a denotes a lock nut for fixing the adjusting screw 165 in a desired position, and 165b a cover which is removable from the valve 152 and provided for protecting the adjusting screw 165.

A bypass fluid line 169 branches off from the input fluid line 145 of the creep-inhibiting valve 152 and permanently communicates with the output fluid line 114 of the same valve 152 through a filter 164 and a restriction 154. The upper pressure chamber 160 of the creep-inhibiting valve 152 permanently communicates with an output fluid line 159 connected to a port 180a of a selector valve 170 hereinafter referred to. A feedback fluid line 167 branches off from the output fluid line 114 and is disposed to be communicated with a drain line 163 of the creep-inhibiting valve 152 through an electromagnetic valve 156 and a fluid line 166. The communication between the feedback fluid line 167 and the drain line 163 is selectively established and blocked by the valve body 153 of the creep-inhibiting valve 152.

The electromagnetic valve 156 is electrically connected to a solenoid driving circuit 102. A brake sensor 100, a vehicle speed sensor 182 and an engine cooling water temperature sensor 183 are connected to respective input terminals of an AND circuit 103 of the solenoid driving circuit 102. The AND circuit 103 has its output terminal connected to the base of a transistor Tr which has its emitter grounded and is connected at its collector to one end of a solenoid, not shown, of the electromagnetic valve 156 via a line 104. The other end of the solenoid is connected via a line 105 to a predetermined power supply source, not shown.

The brake sensor 100 is provided for determining whether or not a brake pedal, not shown, of the vehicle is stepped on, and it generates a signal having a high level when the brake pedal is stepped on. For instance, a switch for turning on and off the stop lamps may be used as the brake sensor 100. The vehicle speed sensor 182 is adapted to generate a signal having a high level when the vehicle speed is smaller than a reference value, and comprises a magnet which may be driven by a speedometer cable, and a reed switch for instance, while the engine cooling water temperature sensor 183 is adapted to generate a signal having a high level when the temperature of the engine cooling water is higher than a reference value which may be set at a value equal to or lower than 0° C., and comprises a member formed of a thermoferrite material, and a reed switch for instance.

When the vehicle speed is lower than the reference value and at the same time the engine cooling water temperature is higher than its reference value while the brake pedal is stepped on, the output of the AND circuit 103 goes high to cause the transistor Tr to conduct, whereby the electromagnetic valve 156 is energized to displace its valve body 157 to an upper or open position as illustrated. On the other hand, when any one of these conditions is not fulfilled, the electromagnetic valve 156 is deenergized and accordingly its valve body 157 assumes a lower or closed position.

The selector valve 170 has its valve body 171 always biased leftward as viewed in FIG. 2, by a spring 172. A spring chamber 177 is defined in part by a right end face of the valve body 171 and connected to a drain line 178, while a pressure chamber 176 is defined in part by a left end face of the valve body 171 and connected via a parallel circuit formed by a check valve 174 and a restriction 173, to a fluid line 146 which delivers the throttle pressure Pt. An axially central portion of the valve body 171 has its outer peripheral surface formed with an annular groove 171a which is disposed to communicate the port 180a with a port 180b when the valve body 171 is in a first position as illustrated. The fluid line 146 branching off from the pilot fluid line 48 is connected to the port 180b, and a fluid line 179 branching off from the fluid line 146 is connected to a port 180c which permanently communicates with the port 180a. A one-way valve 175 is arranged in the fluid line 179 to allow the pressurized oil to flow in a sole direction from the fluid line 146 to the port 180c. The valve 170 further includes a port 180d which is connected to the fluid line 145 and disposed to be communicated with the port 180a via the annular groove 171a when the valve body 171 assumes a right or second position shown in FIG. 4. The one-way valve 174, the restriction 173 and the selector valve 170 cooperate to function as a retarding valve 81.

The retarding valve 81 and the creep-inhibiting valve 152 constructed as above operate as follows:

When the vehicle speed is lower than its reference value and the engine cooling water temperature is higher than its reference value while the brake pedal is stepped on, that is, when the vehicle is in a condition wherein creeping should be inhibited, the electromagnetic valve 156 is in an energized state with its valve body 157 biased to the upper or open position. If, on this occasion, the throttle pressure Pt in the fluid line 146 is substantially zero, the valve body 171 of the selector valve 170 is maintained in the left position by the urging force of the spring 172, to fully communicate the fluid line 146 with the fluid line 159 through the annular groove 171a. Accordingly, the pressure in the upper pressure chamber 160 of the creep-inhibiting valve 152 is low. On the other hand, the line pressure P1 is introduced from the fluid line 145 directly and/or through the fluid line 169 provided with the restriction 154, to the lower pressure chamber to act upon the lower end face of the valve body 153, whereby the valve body 153 is displaced upward. When the valve body 153 is displaced upward through a certain stroke, the fluid line 166 connected to the fluid line 114 becomes communicated with the drain line 163, and the input fluid line 145 is blocked by the valve body 153. Since the line pressure P1 acting upon the lower end face of the valve body 153 is supplied there solely through the restriction 154 of the fluid line 169, the annular groove 162 and the small hole 155, the valve body 153 is held at an equilibrated position shown in FIG. 3, wherein the pressures acting upon the opposite end faces of the valve body 153 are equilibrated. More specifically, if the valve body 153 moves upward from the FIG. 3 position, the operating oil in the annular groove 162 escapes through the fluid lines 167, 166 and the drain line 163 to decrease the oil pressure in the annular groove 162 and the lower pressure chamber 161. Accordingly, the valve body 153 is displaced downward to resume the equilibrated position shown in FIG. 3. On the other hand, when the valve body 153 assumes a position downward of the FIG. 3 position, the line pressure P1 is directly supplied from the fluid line 145 to the annular groove 162 to promptly increase the pressure in the annular groove 162 and the lower pressure chamber 161, whereby the valve body 153 is again brought into the equilibrated position shown in FIG. 3. The clutch pressure P in the fluid line 114 is thus maintained at a pressure Po by the valve 152, which is not high enough to cause engagement of the first-speed clutch C1. Therefore, the clutch C1 is maintained in a disengaged state to prevent creeping of the vehicle.

This set pressure value Po is determined by the pressure-receiving surface of the lower end face of the valve body 153, the cross-sectional area of the restriction 154, the line pressure P1, the force of the spring 158, etc., and can be adjusted to a higher value by axially inwardly displacing the adjusting screw 165 to further compress the spring 158, and to a lower value by axially outwardly displacing the screw 165 to reduce the urging force of the spring 158.

Figure 4:
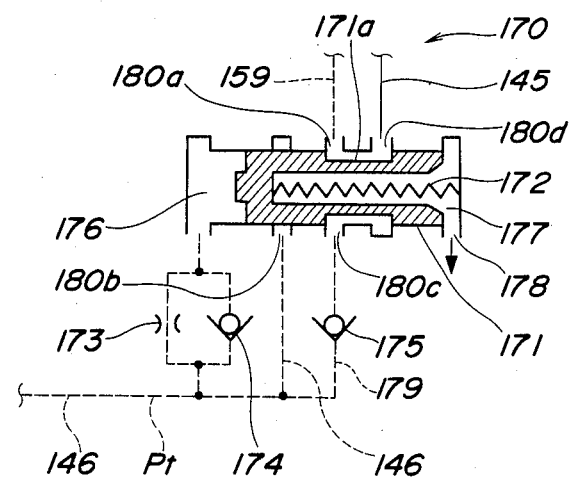
FIG. 4 is a fragmentary circuit diagram of the hydraulic control system of FIG. 2, showing a selector valve having a shifting speed retarding function, in a second position which is assumed when a throttle pressure Pt increases above a predetermined value.

When the throttle valve is opened to increase the throttle pressure Pt in the fluid line 146 above a reference pressure Ps', the throttle pressure Pt thus increased is introduced into the pressure chamber 176 of the selector valve 170 through the check valve 174, so that the valve body 171 is shifted rightward to the second position shown in FIG. 4, against the force of the spring 172. Therefore, the line pressure P1 in the fluid line 145 is now supplied to the fluid line 159 through the annular groove 171a of the selector valve 170. The line pressure P1 supplied from the fluid line 145 is higher than the throttle pressure Pt supplied from the fluid line 146 and accordingly the check valve 175 is closed by the line pressure P1, whereby the throttle pressure Pt in the fluid line 146 is prohibited from being supplied to the fluid line 159 through the check valve 175 of the fluid line 179. Thus, the pilot pressure P1 in lieu of the throttle pressure Pt is supplied to the fluid line 159, with almost no waste of the throttle pressure Pt.

That is, the selector valve 170 operates in response to the throttle pressure Pt supplied thereto as a pilot signal from the fluid line 146 to output the line pressure P1 to the fluid line 159 when the throttle pressure Pt exceeds the reference pressure Ps'. The line pressure P1 thus supplied to the fluid line 159 is then introduced into the upper pressure chamber 160 via the port 168 so that the valve body 153 is promptly displaced downward due to the difference in pressure-receiving surface area between the upper and lower end faces of the valve body 153, as well as the force of the spring 158, to thereby fully communicate the input fluid line 145 with the output fluid line 114 to bring the first-speed clutch C1 into a creep-permitting state.

Now, let it be assumed that the electromagnetic valve 156 is deenergized with its valve body 157 shifted to the lower or closed position.

Figure 3:
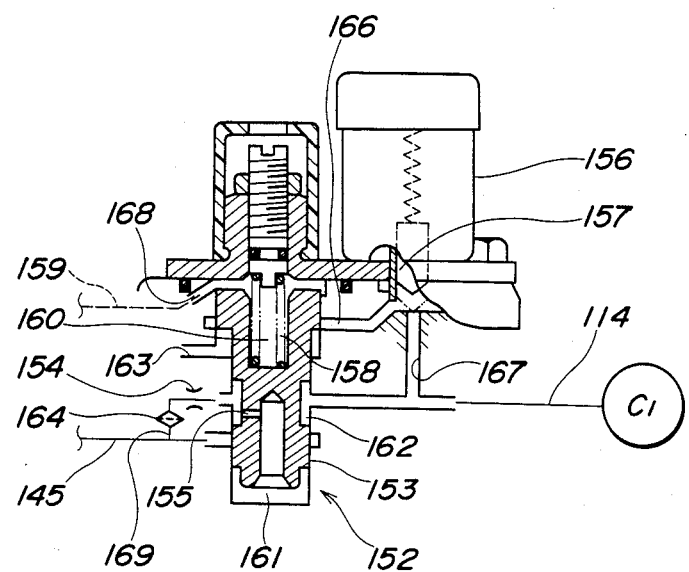
FIG. 3 is a fragmentary circuit diagram of the hydraulic control system of FIG. 2, showing a creep-inhibiting valve in a position wherein the creeping of the vehicle is inhibited.

When the throttle pressure Pt in the fluid line 146 is substantially zero and accordingly the pressure in the fluid line 159 is low, the line pressure P1 in the input fluid line 145 is supplied directly and/or through the bypass fluid line 169 to the creep-inhibiting valve 152, and then introduced into the lower pressure chamber 161 through the annular groove 162 and the small hole 155, so that the line pressure P1 acts upon the valve body 153 at its lower end face to bias same upward to the second or FIG. 3 position. With the valve body 153 held in this position, the input fluid line 145 is blocked by the valve body 153 and therefore the line pressure P1 is supplied to the lower pressure chamber 161 solely through the restriction 154 of the bypass fluid line 169, the annular groove 162 and the small hole 155. However, since the pressurized oil in the fluid line 114 cannot be drained through the fluid line 167 which is then blocked by the valve body 157, the first-speed clutch C1 is supplied with the line pressure P1 higher than the engaging pressure Pe and therefore brought into a creep-permitting state.

When the throttle pressure Pt in the fluid line 146 increases above the reference pressure, the line pressure P1 is now supplied through the fluid line 159 and the port 168 to the upper pressure chamber 160 as stated before. Accordingly, the valve body 153 is promptly displaced downward due to the difference in pressure-receiving surface between the upper and lower end faces of the valve body 153, as well as the force of the spring 158. On this occasion, the input fluid line 145 still communicates with the output fluid line 114 to continually hold the first-speed clutch C1 in the creep-permitting state.

When the brake pedal is released from its stepped-on position while the first-speed clutch C1 is maintained in a creep-inhibiting state, the creep-permitting state of the clutch C1 is recovered in the following manner: While the clutch C1 is in a creep-inhibiting state, the valve body 153 of the creep-inhibiting valve 152 assumes the second position shown in FIG. 3. If, on this occasion, the brake pedal is released from its stepped-on position and accordingly the electromagnetic valve 156 is deenergized to block the feedback fluid line 167 with its valve body 157, the line pressure P1 is supplied to the fluid line 114 through the restriction 154 of the bypass fluid line 169 so that the clutch pressure P in the fluid line 114 is gradually increased above the engaging pressure Pe without causing downward displacement of the valve body 153. In this manner, the creep-permitting state of the first-speed clutch C1 is gradually recovered.

However, if the accelerator pedal is then stepped on, the line pressure P1 is promptly introduced into the upper pressure chamber 160 through the selector valve 170 and the port 168 as stated before, so that the valve body 153 promptly moves downward in response to the stepping-on speed of the accelerator pedal, to thereby promptly increase the pressure in the fluid line 114.

On the other hand, let it now be assumed that the accelerator pedal is stepped on while the electromagnetic valve 156 is maintained in an energized state, for instance, the throttle pressure Pt increases by an amount corresponding to the stepping amount of the accelerator pedal upon starting of the vehicle on an ascending slope. In this event, at an initial stage when the accelerator pedal is being stepped on, due to the action of the retarding valve 81, the pressure in the upper pressure chamber 160 of the creep-inhibiting valve 152 is increased in proportion to an increase in the valve opening of the throttle valve to gradually increase the clutch pressure P of the first-speed clutch C1, and then finally increased to a value equal to the line pressure P1, whereby smooth starting of the vehicle is ensured. On the other hand, when the throttle valve is suddenly opened for rapid starting of the vehicle, the line pressure P1 directly acts upon the valve body 153 of the creep-inhibiting valve 152 to displace same downward, whereby the first-speed clutch C1 promptly recovers a creep-permitting state, ensuring good responsiveness of the creep-inhibiting device to prompt vehicle starting operation by the driver.

On the other hand, when the accelerator pedal is suddenly released from its stepped-on position and accordingly the throttle pressure Pt in the fluid line 146 is suddenly decreased, the oil pressure in the pressure chamber 176 of the selector valve 170 is gradually drained via the restriction 173 alone, so as to allow the valve body 171 to be gradually displaced leftward until finally the communication between the fluid lines 145 and 159 is blocked by the valve body 171, thereby preventing a shock from taking place upon abrupt closing of the throttle valve, through the action of the retarding valve 81.

Although in the foregoing embodiment, creeping of the vehicle is inhibited by blocking the communication between the first-speed clutch C1 and the operating oil source by means of the creep-inhibiting valve, the creep-inhibiting valve of the invention may alternatively be applied to an arrangement in which the pressurized oil to be supplied to the hydraulically operating portion of the first-speed clutch C1 can be drained to the oil tank to inhibit creeping of the vehicle.

What is claimed is:

1. In a creep-inhibiting device for use in an automotive vehicle equipped with an engine, a fluid coupling, a transmission mechanism coupled in series to said fluid coupling and having a frictionally engaging element, and an operating fluid source for supplying an operating fluid to said frictionally engaging element, said device including:
   engine load sensor means for producing a signal fluid having a pressure proportionate to load applied on said engine; and
   control means interposed between said frictionally engaging element and said operating fluid source,
   wherein said control means is adapted to control the power transmission capacity of said frictionally engaging element within a range from substantially zero to a predetermined value in dependence on the pressure of said signal fluid supplied thereto, to inhibit creeping of said vehicle when said engine is in a no-load state,
   the improvement wherein said control means comprises:
   an input fluid line connected to said operating fluid source;
   an output fluid line connected to said frictionally engaging element;
   a valve body disposed to selectively connect and disconnect said input fluid line to and from asid output fluid line and having:
   first and second end faces,
   a first pressure chamber defined in part by said first end face of said valve body always connected to said output fluid line to be supplied with an operating fluid pressure in said output fluid line,
   a second pressure chamber defined in part by said second end face of said valve body and disposed to be supplied with the pressure of said signal fluid;
   a third fluid line having a restriction located between said operating fluid source and said valve body and disposed to always connect said input fluid line to said output fluid line;
   resilient means arranged in said second pressure chamber and urging said valve body in a direction of connecting said input fluid line to said output fluid line counteracting the pressure in said first pressure chamber; and
   a drain line disposed to be opened and closed by said valve body so that said input fluid line is connected to and disconnected from a zone under a lower pressure via said drain line, said drain line escaping said operating fluid pressure in said output fluid line to said zone under a lower pressure when said valve body is biased in a direction of disconnecting said input fluid line from said output fluid line, by an amount corresponding to the amount by which said valve body is biased in the last-mentioned direction;
   said input fluid line, said output fluid line, and said drain line being so located relative to said valve body that said valve body connects said input fluid line to said output fluid line when said valve body is displaced toward said first pressure chamber, and said valve body disconnects said input fluid line from said output fluid line and at the same time connects said drain line to said zone under a lower pressure when said valve body is displaced toward said second pressure chamber;
   said valve body being displaceable in response to a difference between the operating fluid pressure in said first pressure chamber and the pressure of said signal fluid in said second pressure chamber to assume an equilibrated position wherein the operating fluid pressure in said output fluid line is maintained at a pressure slightly lower than an engaging pressure at which said frictionally engaging element engages, when the engine is in said no-load state.

2. A creep-inhibiting device as claimed in claim 1 wherein said vehicle has a braking device, said creep-inhibiting device further including brake sensor means for detecting whether or not said braking device is inoperative, and shut-off valve means adapted to block said drain line when said braking device is detected to be inoperative by said brake sensor means.

3. A creep-inhibiting device as claimed in claim 1, wherein said control means further includes adjusting means for adjustihng the magnitude of said operating fluid pressure in said output fluid line so that the power transmission capacity of said frictionally engaging element is substantially zero.

4. A creep-inhibiting device as claimed in claim 3, wherein said adjusting means is adapted to adjust the resilient force of said resilient means.

* * * * *